United States Patent [19]

Adamek et al.

[11] Patent Number: 4,562,787
[45] Date of Patent: Jan. 7, 1986

[54] FORKED BOOM OR SPREADER GAFF FOR SAILBOARDS

[75] Inventors: Joachim Adamek, Munich, Fed. Rep. of Germany; Albert Gaide, Monnaz, Switzerland

[73] Assignee: Mistral Windsurfing AG, Nurensdorf, Switzerland

[21] Appl. No.: 464,891

[22] Filed: Feb. 8, 1983

[30] Foreign Application Priority Data

Feb. 15, 1982 [DE] Fed. Rep. of Germany ... 8204104[U]

[51] Int. Cl.⁴ .............................................. B63H 9/10
[52] U.S. Cl. ........................................ 114/97; 114/39; 403/328
[58] Field of Search ....................... 114/39, 89, 90, 97, 114/98, 102, 103, 104, 105, 106, 107, 392; 403/328, 399

[56] References Cited

U.S. PATENT DOCUMENTS

| | | | |
|---|---|---|---|
| 3,141,435 | 7/1964 | Moffitt | 114/102 |
| 3,679,244 | 7/1972 | Reddy | 403/328 |
| 4,012,039 | 3/1977 | Yerke | 273/81 R |
| 4,329,078 | 5/1982 | Crates et al. | 403/329 |

FOREIGN PATENT DOCUMENTS

| | | | |
|---|---|---|---|
| 242963 | 4/1960 | Australia | 52/148 |
| 2912671 | 7/1980 | Fed. Rep. of Germany | 114/97 |
| 3005483 | 8/1981 | Fed. Rep. of Germany | 114/39 |
| 8121972 | 4/1982 | Fed. Rep. of Germany | 02001982/DEX |
| 2365478 | 4/1978 | France | |
| 2439130 | 5/1980 | France | |

Primary Examiner—Trygve M. Blix
Assistant Examiner—Thomas J. Brahan
Attorney, Agent, or Firm—Parkhurst & Oliff

[57] ABSTRACT

The forked or wishbone boom or spreader gaff has two individual booms. Each boom has two sections which are telescopically fitted into each other. An arresting device is provided to lock the two respective boom sections in an adjustable position. Accordingly, the length of a given forked boom is adjustable to the cut of various sails of sailboards.

21 Claims, 9 Drawing Figures

FORKED BOOM OR SPREADER GAFF FOR SAILBOARDS

BACKGROUND OF THE INVENTION

1. Field of the Invention

The present invention relates to a forked or wishbone boom or spreader gaff for sailboards, having two outwardly bent booms and a tack fitting and an aft or clew fitting, which tack fitting is intended to be mounted to the mast of a sailboard and to which aft or clew fitting is intended to be mounted the clew of a sail spanned between the two booms, which booms serve as manipulating members to control the sail, which booms are interconnected by the tack fitting and by the aft or clew fitting and consist of tubes.

2. Description of the Prior Art

Forked booms of sailboards of the above described construction are commonly known. Recent further developments in the sport of sailboarding have led to the use of sails having individually differing cuts for application together with varying board constructions for specifically varying wind conditions. The length of the commonly known forked booms has a predetermined extent in which the distance between the tack fitting and the aft or clew fitting corresponds roughly to the distance between the luff of the sail and the clew of the sail of a racing sail, having an area of about 6.5 square meters. These forked booms are usually too long when used on jumping boards and also too short for a specific application for sailing in calm weather. Nowadays so-called Maui-sails or High-clew-sails are set for sailing in strong winds and for the utilisation on jumping boards, which sails feature a distinctly shorter distance between the luff and the clew of the sail. The same proves true for storm sails. If such shortened sails are used together specifically with jumping boards and so-called gliding boards the rear end of the forked boom dips into the water when sailing a reach, which obviously in an unacceptable condition. Accordingly, it has been necessary until now to use at least two different forked booms together with the various cuts or shapes of the sails, namely a long boom for racing purposes and a short boom for Maui and storm sails. When sailing with sails cut specifically for sailing in calm weather an elongation of the off-the-shelf available forked booms has been mounted.

SUMMARY OF THE INVENTION

Hence, it is a general object of the present invention to provide a mechanically rugged adjustable forked boom, which can be used together with all different kinds of cuts of sails.

Another object of this invention aims at a provision of a new and improved construction of a forked boom having two booms comprising each a forward and a rearward boom section, which boom sections are telescopically movable relative to each other such that a rearward boom section and a forward boom section each is provided, which boom sections are interconnected by means of the aft or clew fitting and the forward boom sections are interconnected by means of the tack fitting and each two booms comprising further a form-locked coupling means, which allows a step-wise locking of an adjusted position of the two boom sections relative to each other.

Such leads now to the advantage, that one given forked boom may be adjusted so as to increase or decrease its length to correspond to any individual cut of a sail. The form-locked coupling means of the telescopically adjustable boom sections provides a mechanically sound and rugged locking of a chosen length of the boom.

A further object is to provide a forked boom in which the rearward boom sections are displaceably received in the respective forward boom sections and in which the outer diameter of the rearward boom sections corresponds substantially to the inner diameter of the forward boom sections. The advantage of such design is that the forward boom sections may be designed with a larger thickness, bearing in mind that this forward boom sections are used as grip or handle bar, with which the sailor controls the sail of the sailboard.

Yet a further object is to provide the form-locked coupling means with locking bodies and to provide recesses in the rear boom sections, distributed along the length thereof, such that the locking bodies are insertable into the recesses in order to engage the recesses. Preferably a manually operable control member is provided for controlling the insertion of the locking bodies.

A further object is to provide a forked boom in which the locking bodies are mounted to spring means, which spring means bias the locking members into their disengaged position.

A further object is to provide a forked boom in which the recesses are located in a rail of a plastic material and the rearward boom sections are provided with a groove each, in which respective grooves the respective rails are held in a form-locked condition. Preferably these grooves have a dovetail-shaped or trapezoidal cross-section.

Yet a further object is to provide a forked boom in which its rearward boom sections are provided with two grooves and rails located oppositely to each other and in a horizontal plane. The rearward boom sections are advantageously aluminum profiles, which are integrally shaped with the grooves. In addition to the obviously cost saving manufacture of such a design, the rear boom sections feature a noticeable stiffening in the direction of the main loading plane thereof. Additionally, it is not necessary to drill a row of holes into the rear boom sections in order to form the form-locked coupling, which again leads to a lowering of the cost of manufacture and, furthermore, maintains the watertight condition of these sections.

Yet a further object is to choose the relative cross-sectional areas of the plastic rail and the groove such that the groove defines between the recesses together with the outer surface of the rear boom sections a substantially continuous plane.

Yet a further object is to provide a forked boom, in which the rails comprise sections intermediate of the recesses which are bulged and protrude somewhat above the outer circumference of the rear boom sections. The advantage thereof is that merely point-shaped areas of contact prevail between the rear boom sections and the inner surface of the front boom sections, which points of contact are located on the bulged areas. This design allows an easy and tiltless relative shifting of the boom sections.

Yet a further object of the invention is to design the forked boom with spring means which comprise leaf-springs, which are mounted to the forward boom sections and in which the control members comprise a sleeve each, axially movable along the forward boom sections and encasing the leafsprings and locking bodies, which locking bodies are located movably within through-bores provided in the front boom sections, and in which the sleeve is provided with cam surfaces located at the inner side thereof, which upon a moving of the sleeve along the forward boom section urge the locking bodies through the through-bores into the recesses of the rearward boom sections. This allows a provision of an extremely rugged and specifically easily controllable coupling.

A further object is to manufacture the sleeve in the forked boom of a plastic or rubber material, and to form the cam surfaces with an annular area, which can be slid along the respective forward boom sections and comprises an inclined section which is inclined against the forward boom section and continuous into a hollow space, which receives the locking bodies and springs in an at least partly relaxed state.

A further object is to provide a sleeve manufactured of a plastic or rubber material, and to provide the cam surfaces on a metal ring which may be slid along the forward boom section or then to form the cam surfaces on an inner reinforcement of the sleeve.

A further object is to provide the cam surfaces on a metal ring mounted to the sleeve, acting simultaneously as a guide for the shifting movement of the sleeve.

A further object is to provide a forked beam in which the form-locked coupling means comprise locking bodies mounted to a radial spring element each and in which a rotatable sleeve with cam surfaces is provided which encloses the locking bodies, which are movably located in recesses provided in the forward boom sections such that upon a rotation of the sleeve the form bodies are urged into the recesses of the rear boom sections.

Yet a further object is to provide a forked boom, in which the locking bodies are mounted to a common curvilinear spring element, which holds the locking bodies in the recesses of the front boom sections. Such embodiment provides a specifically light and rugged design of the coupling, which is quite advantageous regarding the manufacturing costs.

BRIEF DESCRIPTION OF THE DRAWINGS

The present invention will be more fully understood by reference to the following detailed description thereof and read in conjunction with the attached drawings and wherein.

DETAILED DESCRIPTION OF THE PREFERRED EMBODIMENTS

Figure 1:
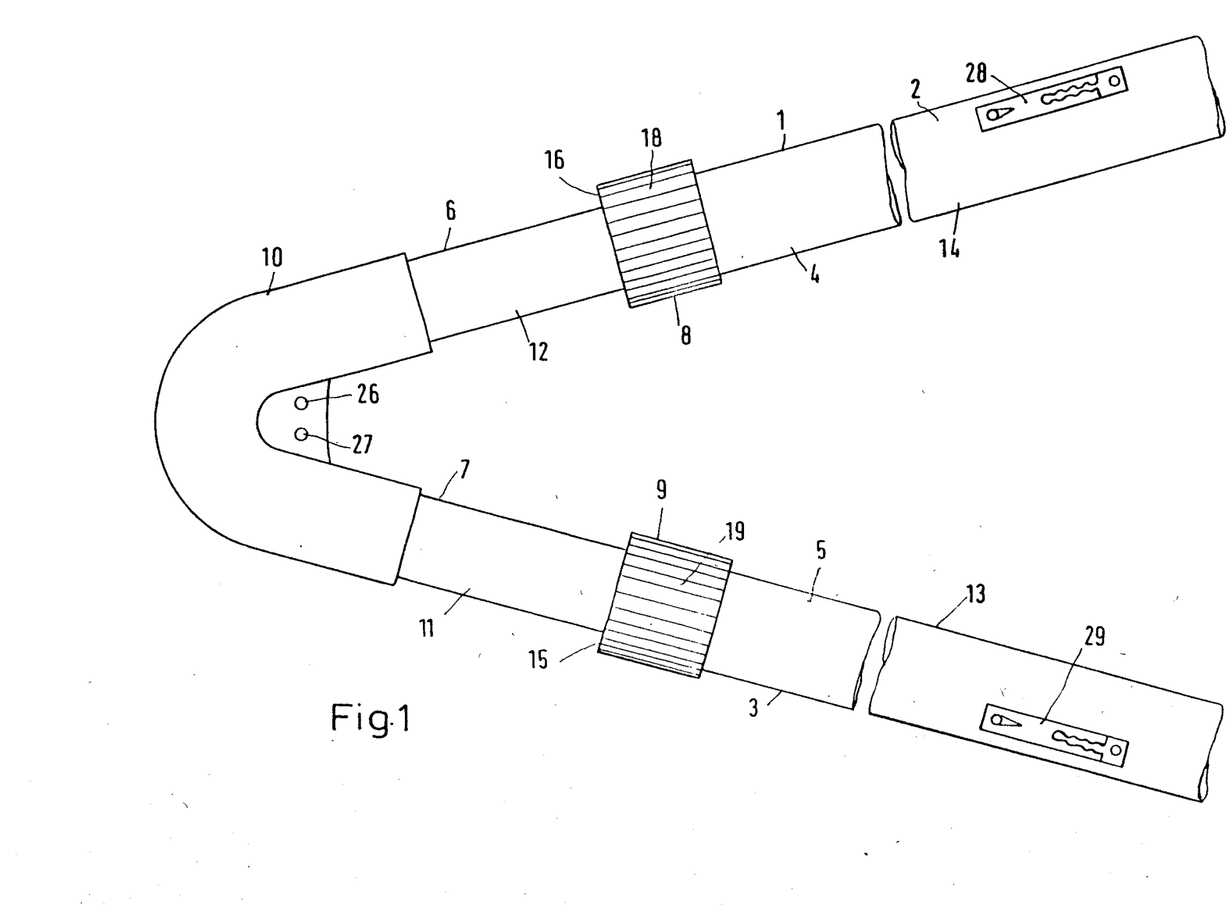
FIG. 1 is a top view of the rear section of a forked boom manufactured in accordance with the invention.

In FIG. 1 the rear or aft section of a forked boom embodying the invention is identified by numeral 1 and the front section of the forked boom, including the tack fitting, has been left out, because this section is a generally known design. The length of the rear part of the forked boom 1 embodying the invention is adjustable.

The forked boom 1 consists basically of two outwardly bent booms 2, 3, which booms 2, 3 are interconnected at their forward end by a not specifically shown tack fitting and at their rear end by an aft or clew fitting 10. The clew fitting 10 is commonly made of a plastic material and is provided with two bore holes 26, 27, through which bore holes 26,27 a trimming sheet (not specifically shown) extends, which trimming sheet holds and supports the clew of the not shown sail and which is belayable in two belaying cleats 28, 29.

The booms 2, 3 consist of tubes 4, 5, 6, 7 which are telescopically inserted into each other and movable relative to each other. A once chosen position or adjustment of the relative positions is arrestable or fixable by form-locked couplings 15, 16.

The tubes 6 and 7 are rigidly mounted to the clew fitting 10 and define the rearward boom sections 11, 12, which are inserted into the forward boom sections 13, 14. To this end the outer diameter of tubes 6 and 7 correspond roughly to the inner diameter of tubes 4 and 5.

The form-locked couplings 15 and 16, which arrest or lock an adjusted length of the forked boom are shown in various embodiments in the following figures.

Figure 2:
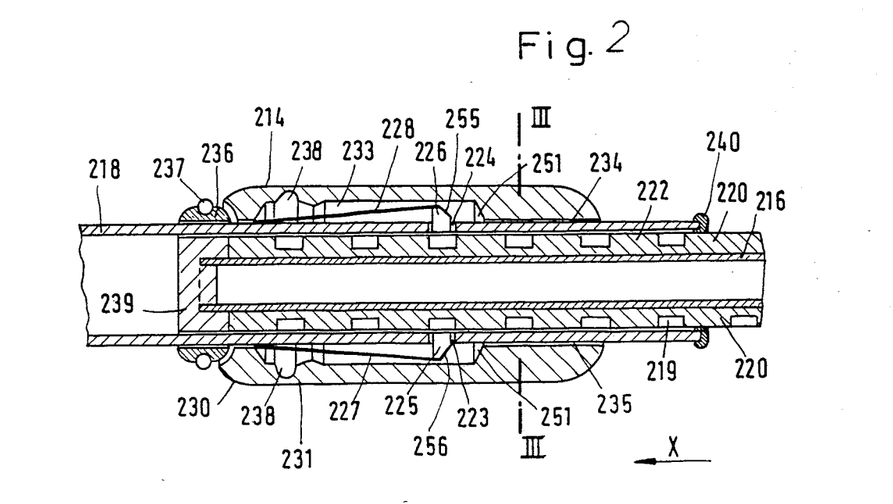
FIG. 2 is a view of a section on an enlarged scale of one of the form-locked coupling means of the one preferred embodiment.

FIG. 2 is a view of a longitudinal or axial section of a first embodiment of one of the form-locked couplings 15 or 16 arranged on a boom 2 or 3, respectively. The section defines a plane extending in the plane of the drawing sheet of FIG. 1. The rearward boom section of this embodiment, identified in FIG. 2 by the reference numeral 216 comprises a number of recesses 219, which are distributed at equal distances from each other along the length of the rearward boom section 216.

Figure 3:
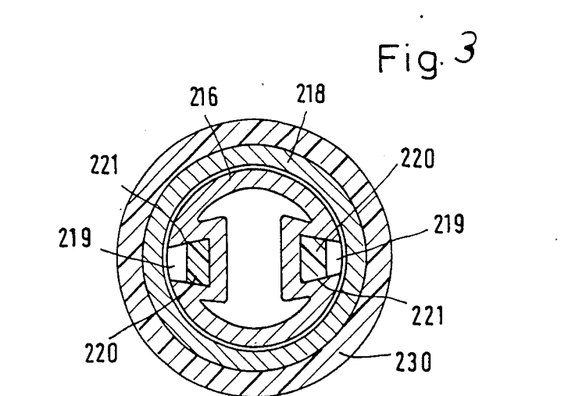
FIG. 3 is a view of a cross-section of FIG. 2 along line III—III thereof on a slightly enlarged scale.

According to this preferred embodiment, which is also shown in FIG. 3, which is a section along line III—III of FIG. 1 the recesses 219 are arranged at equal distances from each other in a rail 220, which is preferably made of a plastic material. As is clearly shown in FIG. 3 two such rails 220 are located oppositely to each other relative to the boom and describe a plane extending horizontally through the boom, which rails 220 are form-closed held in substantially dovetail-shaped grooves 221, located in the rearward boom sections 11, 12. The dovetailed grooves 221 are integrally shaped with the rearward boom sections 11, 12 made preferably from extruded aluminum profiles. Due to the shown arrangement of these dovetailed grooves 221 the moment of resistance of the rearward boom sections 11, 12 extending in that plane, in which the largest forces act thereupon, is increased considerably. Furthermore, the structure of the rails 220 including the recesses 219 maintains the watertightness of the rearward boom sections 11, 12 and, additionally, a larger expenditure on work when manufacturing the rails 220 is avoided.

The cross-sectional dimensions of the dovetailed grooves 221 and the rails 220 are chosen such that the areas of the rail 220 extending between the respective recesses 219 describes a common surface together with the outer circumference of the rearward boom sections 11, 12.

The form-locked coupling is now achieved in that two through-bores 223, 224 located oppositely relative to each other are provided in the forward boom sections 13, 14, the embodiment shown in FIGS. 2 and 3 showing the forward boom section identified by the reference numeral 218. The position of the through-bores 223 and 224 corresponds to the location of recesses 219. Locking bodies 225, 226 are located in the through-bores 223 and 224, respectively. The locking bodies 225, 226 located diametrically opposite to each other are held by means of leaf springs 227, 228 in their respective through-bores 223, 224. These leaf springs 227, 228 are mounted at their distant ends to the forward boom sections, i.e. in this embodiment to the forward boom section 218. The arrangement of this embodiment is chosen such that the leaf springs 227, 228 hold in their relieved position the locking bodies 225, 226, preferably still somewhat inside the through-bores 223, 224.

The form-locked coupling identified in FIG. 2 generally by the reference numeral 214 consists accordingly of the locking bodies 225, 226, which can be moved through the through-bores 223, 224 and which are insertable into the recesses 219 located at a mutual distance from each other within the rearward boom section 216. In order to insert these locking bodies 225, 226 against the pressure of the leaf springs 227, 228 an operating handle 230 is provided such as shown in FIGS. 2 and 3.

According to this embodiment this operating handle 230 comprises a rubber jacket 231, which is axially shiftable on the forward boom section 218. This rubber jacket 231 comprises an inner recess 233 in which the leaf springs 227, 228 are received together with the locking bodies in the relaxed state of the springs. The leaf springs 227, 228 are held in their at least partly relaxed condition in this recess 233 such that the locking bodies 225, 226 project into the through-bores 223, 224, however they do not project into the recesses 219.

In order to lock the form-locked coupling 214 the rubber jacket 231 is shifted to the left as shown in FIG. 2 in the direction of the arrow X such that the surface areas 234 and 235 located at the rearend section of the rubber jacket 231 urge the locking bodies 225, 226 into the recesses 219.

In order to facilitate this shifting movement of the rubber jacket 231 an inclined section 251 is located between the cam sections 234, 235 and the recess 233, which upon a shifting of the rubber jacket 231 glide on corresponding inclined area sections 255, 256 provided on the locking bodies 225, 226.

According to the embodiment shown the leaf springs 227, 228 are mounted to the forward boom section 218 by the agency of a ring-shaped mounting member, holding the leaf springs at the outer surface of the forward boom section 218. A steel ring 237 surrounds the ring-shaped retaining member 236, which steel ring 237 snaps into a recess 238 located at the inner surface of the rubber jacket 231 when the coupling is in its engaged position.

The inner surface areas or sections, respectively 234, 235 of the jacket 231 made of a rubber material to prevent a penetration of water into the coupling in its locked position.

An end block 239 closes the rearward boom section 216 at its front end. Furthermore, the end of the forward boom section 218 comprises a bead-like sealing gasket 240 made of a rubber material or plastics material, which sealing gasket 240 contacts the rearward boom section 216 and prevents water from seeping in at this location. The relative positions are chosen thereby such that if the coupling 214 is in a locked position the sealing gasket 240 is located between two adjoining recesses 219 such as shown in FIG. 2.

It must be mentioned, furthermore, that the rails 220 extend along the complete length of the rearward boom section 216. During assembly these rails 220 will be inserted at a face end of the respective rearward boom section 216 and after insertion they will be held due to their cross-sectional shape corresponding to the trapezoidal cross-section shape of the dovetailed grooves 221.

Figure 4:
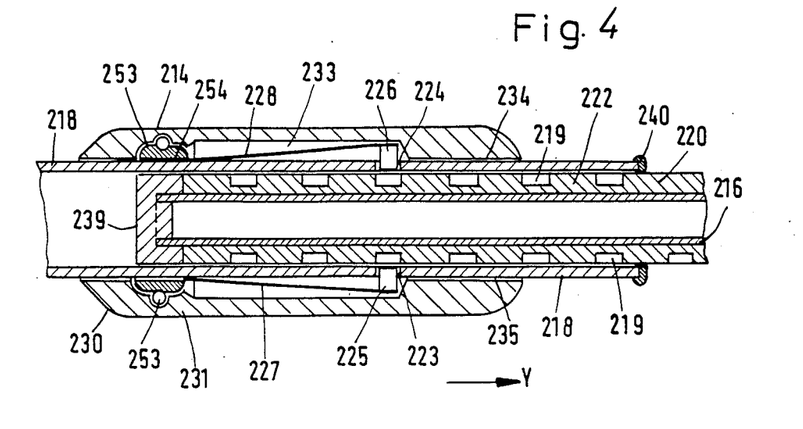
FIG. 4 is a view of a section similar to FIG. 2, however of a further embodiment of the invention.

Referring now to FIG. 4 there is shown a further preferred embodiment of the invention. FIG. 4 is a section corresponding to the section of FIG. 2. In order to lock the coupling 214 of this embodiment of the invention the rubber jacket 231 is shifted towards the right relative to FIG. 4 in the direction of arrow Y. The cam surfaces allowing the locking of the coupling consist in this embodiment of an annular area 254, which is provided at a ring 252 located at the inner side of rubber jacket 231. This ring 252 may also consist of a plastics material whereby the connection between this ring and the rubber jacket 231 is achieved by a coupling section 253 of the ring-shaped reinforcement 252 such that a form-locked coupling is provided. When locking the coupling 214 of this embodiment the cam section 254 of the rubber jacket 231 glides over the leaf springs 227, 228 and urges in its end position the locking bodies 225, 226 in their respective recesses 219. If the coupling 214 is in its locked end position its end has been shifted over the sealing gasket 240 and abuts sealingly the rearward boom section 216. Because the jacket 231 is made of an elastomeric rubber material it will provide an additional seal against the penetration of water at this location.

Figure 5:
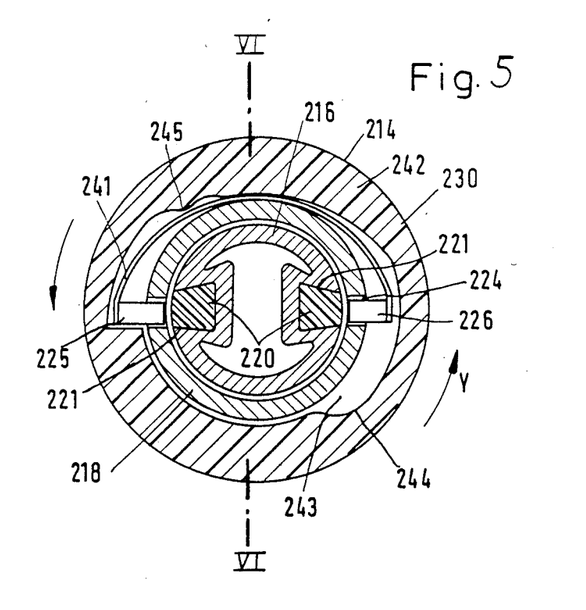
FIG. 5 is a view of a cross-section according to FIG. 3 of a further embodiment of the invention.
Figure 6:
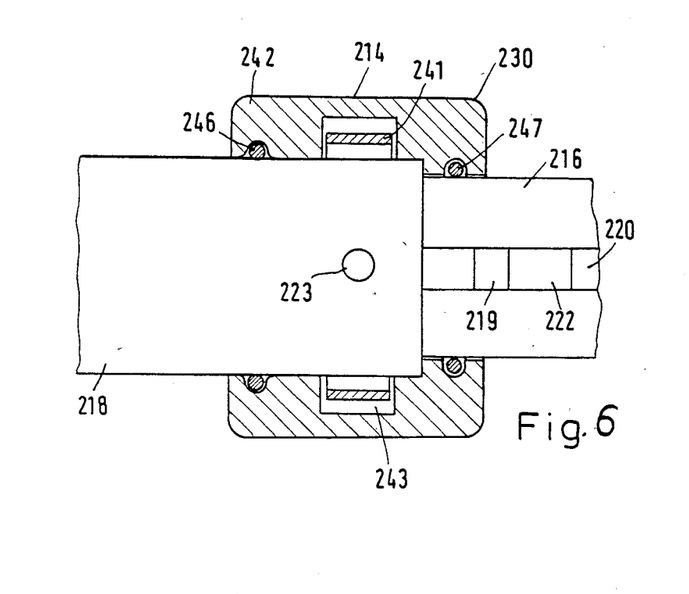
FIG. 6 is a view of a section of FIG. 5 along line VI—VI.

The individual structural members of the further preferred embodiment shown in FIGS. 5 and 6 correspond substantially to those of the coupling of the embodiments according to FIGS. 1 to 4 and the same reference numerals are applied. The embodiment of FIGS. 5 and 6 differentiates from previous embodiments having a longitudinally, i.e. axially movable operating handle, by a rotatable operating handle 230 which urges the respective locking bodies 225, 226 into the corresponding recesses 219.

As is clearly shown in the figures the locking bodies 225, 226 of this embodiment are interconnected by means of a curvilinear leaf spring 241, which leaf spring 241 is supported loosely at the outer surface of the forward boom section 218. The form of this leaf spring 241 is chosen such that the locking bodies 225, 226 in the disengaged position as shown in the figures, in which position the leaf spring 241 is at least partly relaxed, are still held in the through-bores 223, 224 of the forward boom section 218. In order to shift the locking bodies 225, 226 such that they move into the recesses 219 the operating handle 230, which in this embodiment is a rotating sleeve 242, is provided with a space 243, which is open towards the forward boom section 218, which space 243 is provided with a cam section 244.

As is clearly shown in FIG. 5, the cam section 244 is shaped such that upon a rotation in the direction of the arrow Y the locking bodies 225, 226 will be urged through the through-bores 223, 224 located in the forward boom section 218 into the recesses 219 of the rails 220, which rails are mounted to the rearward boom section 216 in accordance with the previous embodiments.

In order to secure a locking of the coupling 214 in its operating position the cam section 244 is provided at a corresponding location with a projection 245, which snaps behind the locking body 224 in the locking position of the coupling.

According to FIG. 6 the rotating sleeve 242 of the coupling 214 may be provided with additional seals 246, 247, which seal the rotating sleeve 242 against the forward boom section 218 and the rearward boom section 216, respectively. The arrangement is chosen again such that at least the sealing gasket 247 is located such that it abuts the rail 220 at the location between the recesses 219 at the rearward boom section 216 when the coupling 214 is in its engaged position.

Figure 7:
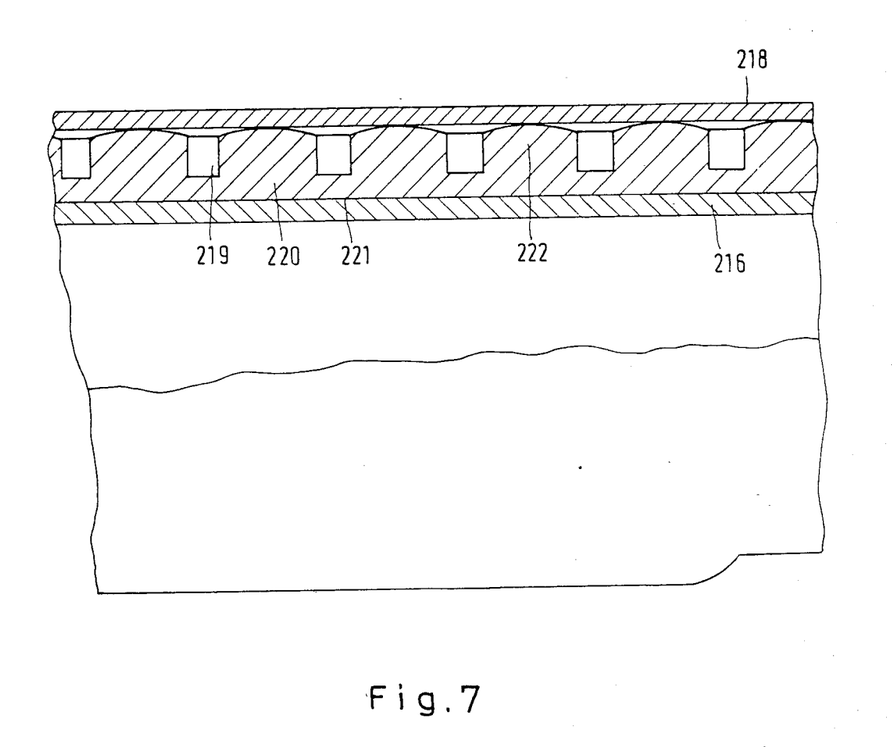
FIG. 7 is a section of a detail shown on an enlarged scale.

FIG. 7 shows on an enlarged scale a section of some details of the rail 220, which preferably is made of a plastics material. According to FIG. 7 the preferred embodiment of the plastic rails 220, which comprise the recesses 219 and are received in the dovetailed grooves 221 are formed such that the material areas between the individual recesses 219 are bulged somewhat. Thereby these bulged sections 222 protrude by a small distance over the outer diameter of the rearward boom section 216. Due to this design the rear boom sections can be slid easily back and forth in the forward boom sections without any relative tilting because no contact at large areas exists between the boom sections. They contact each other merely at pointlike places on mentioned bulged sections 222.

Figure 8:
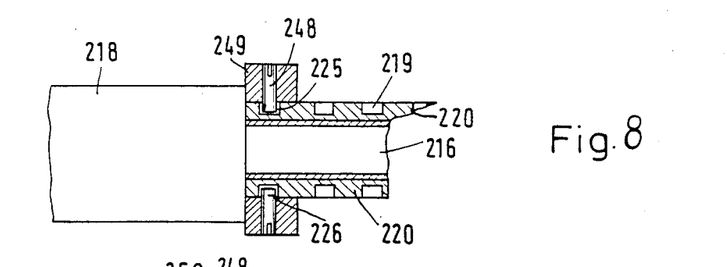
FIG. 8 is a view of a section of a further embodiment.
Figure 9:
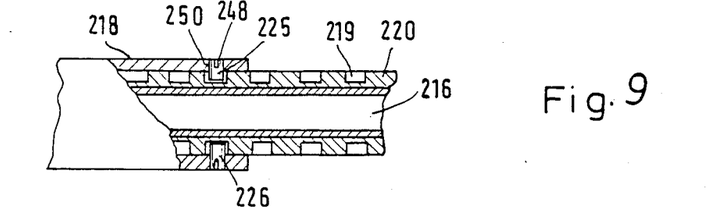
FIG. 9 is a section similar to FIG. 8 of yet a further embodiment.

FIGS. 8 and 9 show two specifically simple embodiments of the invention. The locking bodies 225, 226 of these embodiments are merely threaded bolts 248.

According to the embodiment shown in FIG. 8 these threaded bolts 248 are screwed at two diametrically opposed locations into a sleeve 249, which can be slipped back and forth on the rear boom section 216, which threaded bolts 248 project into the recesses 219. Accordingly, the sleeve 249 can be fixedly mounted at a predetermined location along the rearward boom section 216 and may act as stop for the rearward boom section 216, relative to the forward boom section 218, if it will be moved due to the pressure exerted by the sail against boom section 218.

The threaded bolts 248 of the embodiment shown in FIG. 9 are screwed through corresponding female threaded holes 250, located in the forward boom section 218 and project into the recesses 219.

According to preferred embodiments the rear boom sections 215, 216 are completely filled by a foamed plastics material (not particularly shown) while the forward boom sections 217, 218 are also filled by such foamed material beginning at the location corresponding to the furthermost position, which the front end (closure member 239) of the rearward boom sections 215, 216 can reach within the tubes 4, 5.

In order to cope with all possible cuts of sails the distance along which the tubes 6, 7 can be shifted relative to the tubes 4, 5 should amount to roughly 30 to 40 centimeters (1 to 2 feet).

While there are shown and described present preferred embodiments of the invention, it is to be distinctly understood that the invention is not limited thereto, but may be otherwise variously embodied and practiced within the scope of the following claims. For instance the structures of the form-locked couplings 15, 16 may be varied and other modifications of possible seals applied.

Accordingly, what is claimed is:

1. A wishbone boom for sailboards, having two outwardly bent booms, a tack fitting and an aft or clew fitting, which tack fitting is intended to be mounted to the mast of a sailboard and which aft or clew fitting is intended to mount the clew of a sail spanned between said two booms, which booms serve as manipulating members to control the sail, which booms are interconnected by the tack fitting and by the aft or clew fitting and consist of tubes, said booms comprising each a forward and rearward boom section, which said boom sections are telescopically movable relative to each other, which said rearward boom sections are interconnected by means of said aft or clew fitting and said forward boom sections are interconnected by means of said tack fitting, each of said two booms comprising further a form-locked coupling which allows a stepwise locking of an adjusted position of said two boom sections relative to each other, wherein said form-locked coupling means further comprise locking bodies and recesses distributed along the lengths said rear boom sections, said recesses being located in rails of a plastic material and said rearward boom sections each being provided with a groove in which said rails are held in a form locked condition, said locking bodies being insertable into said recesses in order to engage said recesses.

2. The wishbone boom of claim 1, wherein said rearward boom sections are displaceably received in said respective forward boom sections and the outer diameter of said rearward boom sections corresponds substantially to the inner diameter of said forward boom sections.

3. The wishbone boom of claim 1, wherein said locking bodies are mounted to spring means, which spring means bias said locking members into their disengaged position.

4. The forked boom of claim 3, wherein said spring means comprise leaf springs which are mounted to said forward boom sections, further wherein said control members comprise a sleeve, each axially movable along said forward boom sections and encasing said leaf springs and said locking bodies, which said locking bodies are located movably within through-bores provided in said front boom sections and wherein said sleeve is provided with cam surfaces located at the inner side thereof, which upon a moving of said sleeve along said forward boom section urge said locking bodies through said through-bores into said recesses of said rearward boom sections.

5. The forked boom of claim 4, wherein said sleeve is manufactured of a plastic or rubber material and said cam surfaces are formed by an annular area which can be slid along said respective forward boom sections, and comprises an inclined section which is inclined against said forward boom section, and continuous into a hollow space which receives said locking bodies and said springs in a at least partly relaxed state.

6. The forked boom of claim 4, wherein said sleeve is manufactured of a plastic or rubber material and said cam surface are formed on an inner reinforcement of said sleeve.

7. The forked boom of claim 4, wherein said cam surfaces are provided on a metal ring mounted to said sleeve acting simultaneously as a guide for the shifting movement of said sleeve.

8. The forked boom of claim 4, wherein said sleeve is arrestable when said coupling means are in the depressed position.

9. The wishbone boom of claim 1, wherein said plastic rails and said grooves have corresponding trapezoidal cross-sections.

10. The wishbone boom of claim 5, wherein each said rearward boom section is provided with two grooves and rails located oppositely to each other and in a horizontal plane.

11. The wishbone boom of claim 1, wherein said rearward boom sections are aluminum profiles having said grooves integrally shaped therewith.

12. The wishbone boom of claim 1, wherein said rails comprise sections intermediate of said recesses defining together with the outer circumference of said rear boom sections a substantially continuous plane.

13. The wishbone boom of claim 1, wherein said intermediate sections are bulged and protrude somewhat above said outer circumference.

14. The forked boom of claim 1, wherein said locking bodies comprise threaded bolts which form the form-locked coupling between said forward and said rearward boom sections.

15. An improved wishbone boom for sailboards comprising:
 two outwardly bent tubular booms for serving as manipulating members to control a sail spanned between said booms, each boom having a forward and a rearward boom section telescopically movable relative to each other;
 a tack fitting for mounting to the mast of a sailboard and interconnecting the forward boom sections of said two booms;
 an aft or clew fitting for mounting the clew of said sail and interconnecting the rearward boom sections of said two booms;
 form-locked coupling means for allowing a stepwise locking of an adjusted position of said boom sections relative to each other, comprising on each of said two booms:

recesses distributed along the length of said rearward boom section;
 locking bodies mounted to one or more radial spring elements and insertable into said recesses for engagement therewith, said spring elements movably holding said locking bodies within through-holes formed in said forward boom sections biasing said locking bodies away from engagement with said recesses;
 a manually operable control member for inserting said locking bodies into said recesses upon rotation of said control member, said control member comprising a rotatable sleeve mounted on said boom and encasing said one or more radial spring elements and said locking bodies, said sleeve being provided with cam surfaces on its inner side for urging said locking bodies through said through-holes into said recesses upon rotation of said control members.

16. The wishbone boom of claim 15, wherein the locking bodies of each of said booms are mounted to one common semicircular spring element loosely positioned between the front section of said boom and the control member sleeve of said boom.

17. The wishbone boom of claim 16, wherein said sleeve is lockable by means of a protrusion on the cam surface when said coupling is in its engaged position.

18. The wishbone boom of claim 15, further comprising sealing means acting between said forward and said rearward boom sections.

19. The wishbone boom of claim 15, wherein said forward boom sections are provided with a rubber or similar coating.

20. The wishbone boom of claim 15, wherein said rearward boom sections are filled by a foamed plastic material.

21. The wishbone boom of claim 20, wherein the front section of said forward boom sections is filled by a foamed plastic material, which front section begins at a location at which the front ends of the rearward boom sections are located at the minimal length condition of said forked boom.

* * * * *